United States Patent [19]

Bushor et al.

[11] 4,362,342
[45] Dec. 7, 1982

[54] BEARING CLOSURE ASSEMBLY

[75] Inventors: Ray E. Bushor; Robert F. Bischoff, both of Florissant, Mo.

[73] Assignee: Emerson Electric Co., St. Louis, Mo.

[21] Appl. No.: 104,357

[22] Filed: Dec. 17, 1979

Related U.S. Application Data

[63] Continuation-in-part of Ser. No. 887,947, Mar. 20, 1978, abandoned.

[51] Int. Cl.³ .......................... F16C 33/74; H02K 5/16
[52] U.S. Cl. ..................... 308/36.1; 308/72; 308/121; 310/90
[58] Field of Search ................. 308/15, 22, 36.1, 245, 308/72, 121; 310/85, 89, 90

[56] References Cited

U.S. PATENT DOCUMENTS

| | | | |
|---|---|---|---|
| 1,677,936 | 7/1928 | Thordarson | 310/90 |
| 3,343,016 | 9/1967 | Lewis | 308/15 |
| 3,518,471 | 6/1970 | Wightman et al. | 310/85 |
| 3,544,823 | 12/1970 | Chigirinsky et al. | 310/89 |
| 3,846,652 | 11/1974 | Lykes | 310/89 |
| 3,855,489 | 12/1974 | Hershberger | 310/85 |
| 3,885,176 | 5/1975 | Cunningham | 310/90 |
| 4,008,928 | 2/1977 | Abel | 308/72 |
| 4,055,370 | 10/1977 | Cunningham | 310/90 |

FOREIGN PATENT DOCUMENTS 655031  3/1979  U.S.S.R. ................. 310/90

Primary Examiner—Richard R. Stearns
Attorney, Agent, or Firm—Polster, Polster and Lucchesi

[57] ABSTRACT

A bearing closure assembly for a dynamoelectric machine (e.g., a fractional horsepower motor) is provided which reduces bearing contamination from both airborne dirt and water and which reduces subsequent bearing failure, but which permits increased manufacturing tolerances thus lowering costs. The assembly includes a surface (e.g., a wall) perpendicular to the shaft of the motor having a central opening in it for passage of the shaft. The shaft opening through the surface is defined by a flange integrally formed with the surface. The flange extends axially of the shaft for a substantially greater distance or dimension than the radial clearance between of the shaft and the flange. The closure assembly is also adapted to function as a keeper for a mounting hub ring which in turn enables the dynamoelectric machine to be intermounted to its intended application.

11 Claims, 6 Drawing Figures

BEARING CLOSURE ASSEMBLY

CROSS REFERENCE TO A RELATED APPLICATION

This application is a continuation-in-part of the copending U.S. patent application, Ser. No. 887,947, now abandoned, filed Mar. 20, 1978.

BACKGROUND OF THE INVENTION

This invention relates to bearing closure assemblies, and, in particular, to bearing closure assemblies for dynamoelectric machines (e.g. fractional horsepower electric motors). While the invention is described with particular emphasis to its dynamoelectric machine application, those skilled in the art will recognize the wider applicability of the inventive principles discussed hereinafter.

Certain dyanmoelectric machines are exposed in applicational use to environments having contaminants adverse to machine life. For example, motors used to drive the tumbling basket of a clothes dryer are subjected to heavy airborne lint environmental contamination. Unless some protective measures are taken, the lint enters the bearing structure of the motor and draws lubricant from the bearing, which eventually results in bearing failure and motor loss.

A number of arrangements are known in the prior art which attempt to solve the bearing contamination problem. One common solution in the prior art was to incorporate a separate lint shield or seal which was mounted about the motor shaft with very close tolerances. The lint shield presents a physical barrier to entrance of the contaminants. For example, it has been known to use flexible molded fittings which essentially ride along the motor shaft to create the lint barrier. While this approach works for its intended purpose, the use of this form of lint shield requires very close control of both lint shield dimension and shaft concentricity in order to maintain the proper spacing between the shield and shaft. When close control is not maintained and permitted to exceed tolerance, for example, bearing seal integrity is lost. Further, poor shaft concentricity may cause the shield to ride on the motor shaft resulting in undesirable noise generation.

Surprisingly, the invention disclosed hereinafter permits increased tolerances and dimensions between the shaft and the lint sealing structure, thereby lowering product cost, while providing an improved lint barrier for the bearing structure. The clearance between the closure and shaft can be increased because the axial dimension of a flange defining the shaft passage is much larger than previous designs. I have found this increased distance in itself offers protection against bearing contamination. In addition, a conventional oil slinger is positioned adjacent the bearing closure, which helps to define a baffle structure for contaminant flow. The baffle structure and flange dimension are such that even if lint, or other air borne contaminants, begins to enter the baffle area, it becomes trapped in the passage. The lint or other contaminants thereafter block further contaminant flow long before any of the air borne contaminants reach the area of the bearing. The design thus makes use of the contaminants themselves, a cause of bearing failure in the past, to prevent bearing failure.

In other motor applications, it is highly desirale to prevent water from entering the wick-lubrication system of the motor as the water will deplete the lubricant and will cause premature bearing failure.

During the prosecution of the above-noted prior U.S. application Ser. No. 887,947, the following prior art U.S. Pat. Nos. 1,677,936, 3,343,016, 3,846,652 and 3,855,489 were cited.

In one embodiment of this invention, the bearing closure also is utilized as a keeper for a hub ring. The hub ring is a conventional structure which permits the motor to be mounted in its intended application.

One of the objects of this invention is to provide an improved bearing closure means.

Another object of this invention is to provide a bearing closure having an enlarged axial dimension structure passing an associated shaft, the enlarged axial dimension permitting increased radial tolerances between the shaft and the enlarged axial dimension structure.

Another object of this invention is to provide a bearing closure which may be press fit within a hub of an end shield structure for a dynamoelectric machine.

Another object of this invention is to provide a bearing closure which effectively repels or inhibits water from entering the wick lubrication system of the motor and yet, surprisingly, does not require close radial tolerances or seals between the bearing closure and the shaft.

Still another object of this invention is to provide a bearing closure which results in a long service life for the motor and yet which is of simple and economical construction and which is easily and rapidly installed.

Other objects of this invention will be apparent to those skilled in the art in light of the following description and accompanying drawings.

SUMMARY OF THE INVENTION

In accordance with this invention, generally stated, a bearing closure of the present invention is intended for use with a motor having a shaft and a bearing for journaling the shaft. The bearing closure assembly comprises a planar surface on the outboard side of the bearing having an axial opening therein for reception of the shaft. This opening is defined by a flange extending axially outwardly from the planar surface, the axial extension of the flange from the planar surface having an axial dimension A. The flange clears the shaft at its closest point by a dimension B with the ratio of A/B being at least as great as 5/1. This flange clears the shaft by the dimension B along the entire length of the A dimension of the shaft thus providing a lint and dust shield along the shaft for effectively preventing lint or dust from entering the bearing.

In another embodiment of the bearing closure of the present invention, the flanges extend axially outwardly from the above-mentioned planar surface a distance sufficient so that water striking the outer face of the planar surface runds down the outer surface and around the flange without entering the bearing.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 3:
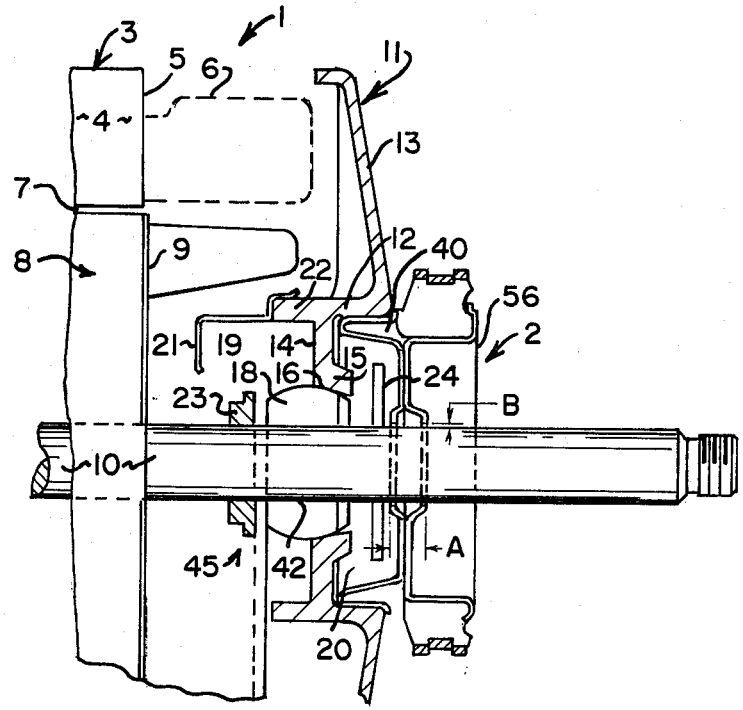
FIG. 3 is a view in side elevation, partly in section and partly broken away, of a dynamoelectric machine employing the bearing closure assembly of FIG. 1.

Referring first to FIG. 3, reference numeral 1 indicates a dynamoelectric machine or motor employing one illustrative embodiment of bearing closure 2 of this invention.

The motor 1 includes a stator assembly 3 including a core 4 constructed from individual laminations 5 formed from suitable magnetic material and secured to one another by any conventional means. Cleating, welding or adhesive bond, singularly or in combination, are conventional ways for forming the core 4. The laminations have winding receiving slots formed in them, and a winding 6, indicated in phantom lines in FIG. 3, is distributed in the slots in a conventional manner. The core has a central rotor receiving bore opening 7 formed in it. A rotor assembly 8 is mounted within the bore opening 7, the rotor assembly 8 being supported at each end by a suitable bearing assembly 45, later described in greater detail.

Rotor assembly 8 may be and preferably is of a conventional squirrel cage design, for example, and the bars of the squirrel cage are shorted along end rings 9. Rotor assembly 8 includes a shaft 10 on which the rotor core is mounted by any convenient method. Heat shrink or press fit are conventional intermounting techniques employed in rotor construction for mounting the shaft with the rotor core.

Each end of the dynamoelectric machine 1 has an end shield or bearing support structure 11 attached to it in a conventional way. Commonly, the stator assembly 1 is mounted within a shell, and the end shields are attached to the shell and to one another by "through bolts" which extend the axial length of the motor, generally engaging the stator core 4 and each end shield. More recently, the end shields have assumed a skeleton or spider construction which are mounted directly to the core 4 of the stator assembly 3. This later construction method may be preferred because it offers a low cost design, although the invention disclosed hereinafter is compatible with a variety of end shield mounting techniques. Conventional bolts or a suitable epoxy adhesive are common expendients for attaching the end shields 11 directly to the core 4.

The end shield 11 includes a central hub 12 having a plurality of arms 13 extending outwardly from it. The arms 13 are used to mount the end shield 11 to the stator core 4 in the particular embodiment shown and described herein.

The hub 12 houses the bearing assembly 45 and includes a radially inwardly extending wall 14. The wall 14 has an end 15 defining a seat 16 which seats one end of a self-aligning bearing 18. The bearing 18 has a central opening 42 through it, which permits passage of the shaft 10 in a conventional manner. The hub 12 defines an interior chamber 19 on the axially inboard side of the wall 14, and an exterior chamber 20 on the axially outboard side of the wall 14. The chamber 19 is closed by a suitable bearing cap 21 which is mounted over an axial projection 22 of the hub 12. The lower half of FIG. 3, only a portion of which is there shown, is symmetrical with the structure shown on the upper half of that figure.

An oil slinger 23 is mounted to the shaft 10 within the chamber 19 near, but spaced from, the bearing 18. Means for locking the bearing 18 against the seat 16 and for providing suitable oil retention material along the chamber 19, although not shown for drawing simplicity, are common expendients utilized in bearing design and are employed with the bearing assembly 45 in a conventional manner.

An oil slinger 24 also is mounted to the shaft 10 on the chamber 20 side of the wall 14. Oil slinger 24 too is conventional and generally is a structure having a first phenolic base surface and a second rubberized surface which are laminated to one another in any convenient way.

The motor structure described above is well known in the art and per se forms no part of the invention disclosed hereinafter. In the prior art, it has been the practice to close the chamber 20 with some type of bearing closure. However, bearing closures of the type available in the prior art often are not successful in preventing entrance of air borne lint, dust particles, water (rain), or other air borne contaminants into the chamber 19. Over a period of time, lint, for example, can provide a capillary path through the bearing closures of the prior art, permitting the lubricant to work or "wick" out of the bearing to the surrounding air environment, with resultant lubricant loss and eventual bearing (and motor) failure. The invention herein disclosed reduces the probability of lubricant loss through the use of bearing closures 2 and 101.

Figure 1:
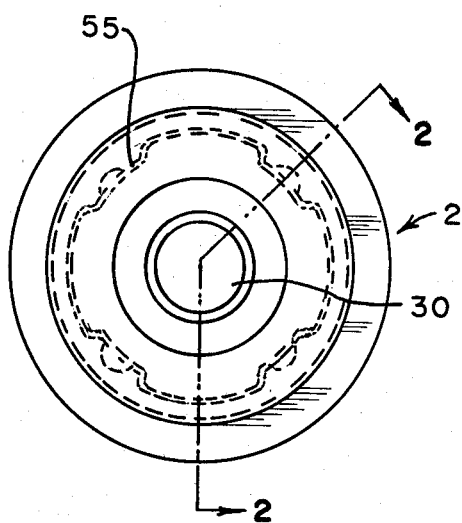
FIG. 1 is a top plan view of one illustrative embodiment of bearing closure of this invention.
Figure 2:
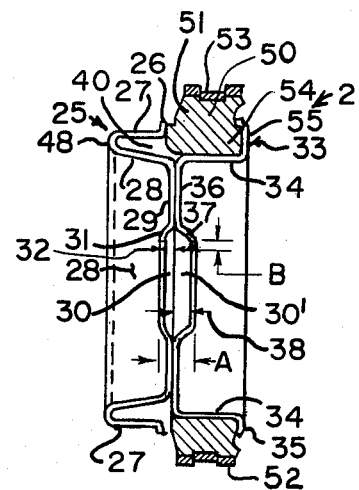
FIG. 2 is a sectional view, taken along the line 2—2 of FIG. 1.

Bearing closure 2, best seen in FIGS. 1 and 2, includes a first axially inboard part 25. The part 25 is a predeterminedly formed structure including an annular lip 26 along its radially outermost dimension, a cylindrical wall 27 extending axially from the lip 26, a reverse bend 48, a generally axially extending cylindrical wall 28, and a radially extending surface 29 (referred to as a planar surface or wall). The surface 29 has a central opening 30 formed in it, defined by an annular flange 31 having a predetermined axial extension 32. The axial extension 32 is important and is discussed in greater detail hereinafter.

A second axially outboard part 33 of the bearing closure 2 also is a formed structure of predetermined shape including an axially extending cylindrical wall 34 terminating in a radial lip 35, the lip 35 being formed to abut a hub ring 50 as later described in greater detail. A radially extending surface 36 is integrally formed with the wall 34 and abuts the surface 29 of the part 25. The surfaces 36 and 29 are joined to one another by any convenient method. Spot welding works well, for example. The surface 36 has a central opening 30' through it defined by a flange 37 having an axial extension 38 which aligns with the annular extension 32 of the part 25 to form a continuous axial extension. The central openings 30-+' delimit a passage through the bearing closure 2 for the shaft 10.

In accordance with this invention, the flanges 31 and 37 as spaced apart by an axial dimension A, best seen in FIGS. 2 and 3, which is chosen to be substantially greater than the radial clearance dimension B between the shaft 10 and the opening 30-30' through the surfaces 29, 36 of the bearing closure 2. That is to say, the ratio A divided by B (A/B) is maximized as much as possible. The ratio of about 7:1 (i.e., the dimension A being approximately seven (7) times greater than the clearance B) works well in commercial embodiments of the present invention. Ratios of 5:1 have worked in test environments. The opening 30-30', forms a baffle system for the bearing closure 2 so that air borne contaminants (e.g., lint) entering space between the shaft 10 and opening 30-30' are trapped before they reach (not shown) chamber 20 in which a lubricant reservoir wicks for bearing assembly 45 is housed.

The axially extending wall 27 is sized diametrically for reception in the hub 12 and is positioned therein in a friction (or pressed) fit. Additional epoxy adhesives, for example, may be employed to intermount the bearing closure 2 with the end shield 11, if desired.

As indicated above, the parts 25 and 33 define a receptacle 40 which engages the hub ring 50, thereby forming an integral unit. In the embodiment illustrated, the part 33 has a plurality of channels 55 formed in it, while the hub ring 50 has projections 54 formed in it, the channels 55 and projections 54 being complementary to one another. The projection 54/channel 55 mate functions to intermount the parts to one another.

Hub ring 50 is conventional, and generally includes a inner portion of resilient material 51 attached to an outer steel ring 52 by any convenient method. The material 51, commonly is a relatively hard rubber like material bonded to the steel ring in a manner similar to that disclosed in U.S. Pat. to Boden et al, No. 3,464,656. The ring 51 has a groove 53 formed in it which is sized to receive a suitable clamping band, not shown, to attach the motor to a particular application in a conventional manner.

Operation of the bearing closure 2 is relatively simple to understand. In manufacturing the dynamoelectric machine 1, the end shields and bearing structures are attached to the stator assembly 3 in a conventional manner. Either before or after that construction, bearing closure 2 is inserted within the end shield by fitting (i.e., pressing) the axial part 27 of the bearing closure into chamber part 20 of the hub 12. As indicated above, additional physical interlocks between the bearing closure 2 and hub 12 commonly may be employed. In general, it may be more convenient, in motor manufacture, to attach the bearing closure 2 to the end shield 11 prior to installing the end shield on the motor. If desired, an additional end cap (not shown) may be used for aesthetic purposes to close an end 56 of the bearing closure 2. In any event, when used in high contaminant atmospheres, the relatively long axial dimension A provided by the flanges 31 and 37 and their axial extensions 32 and 38 relative to radial clearance B between the flanges and shaft 10 prevent air borne contaminants from entering the bearing structure. Because of the defined ratio (A/B) which is maximized with this invention, relatively wide tolerances between the opening 30-30' and the shaft 10 may be employed, without adverse affect on bearing operation.

Figure 4:
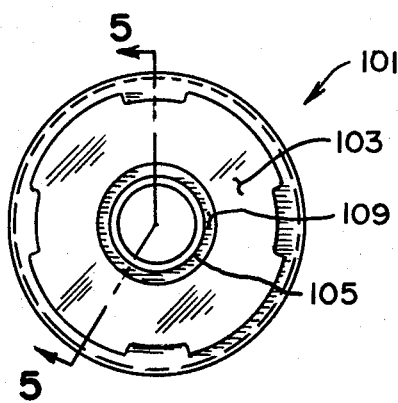
FIG. 4 is an end elevational view of the outboard side of another embodiment of the bearing closure of the present invention.
Figure 5:
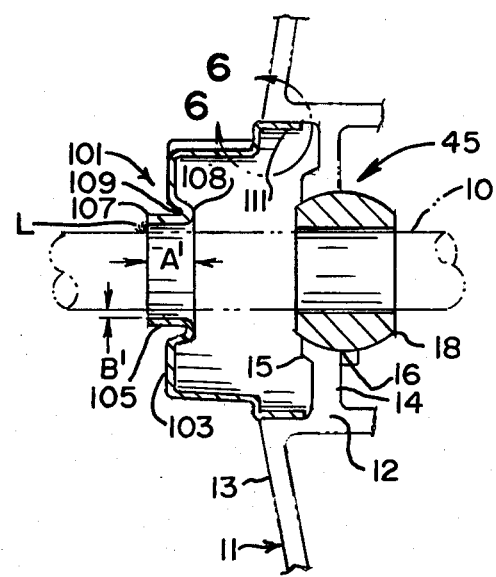
FIG. 5 is a vertical cross sectional view taken along line 5—5 of FIG. 4.
Figure 6:
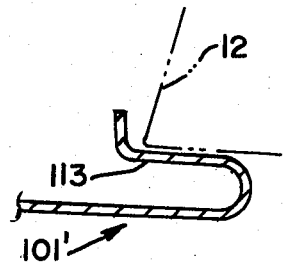
FIG. 6 is a view of a modification of the bearing closure shown in FIGS. 4 and 5 taken on line 6—6 of FIG. 5.

Referring now to FIGS. 4-6, a second embodiment of the bearing closure of this invention is indicated in its entirety by reference character 101. Preferably, like bearing closure 2, bearing closure 101 is a unitary member formed of sheet metal or the like and is adapted to be pressed into hub 12 of end shield 11. Bearing closure 101 has a plate wall 103 extending perpendicularly to the axial centerline of shaft 10. It will be appreciated that plate 103 corresponds generally to planar surface 29 of bearing closure 2. As indicated at 105, a flange is formed in plate 103 so as to be coaxial with shaft 10. Flange 105 extends axially outwardly (i.e., away from bearing 45), from plate 103 and is spaced radially from the outer surface of shaft 10 (shown in phantom in FIG. 5), as indicated by dimension B'. Further, flange 105 may also extend axially inwardly from plate 103 toward bearing 18. The axial length of flange 105 is indicated by dimension A'. In accordance with this invention, dimension A is substantially greater than dimension B' such that the ratio of A'/B' is at least as great as 5/1 thereby to provide a relatively narrow clearance between the inner bore of flange 105 and the outer surface of shaft 10 so as to prevent airborne dust and lint particles or other air borne contaminants from being conveyed past flange 105 into the bearing. It will be understood that with the above-specified ratio of dimensions A'/B', the space between the inner bore of flange 105 and the shaft is such that under normal operating conditions air will not readily flow through the flange and that air borne lint will initially accumulate at the outer end of the flange, as indicated at L in FIG. 5, and thus will block the the flow of air and air borne lint through the space between the shaft and the flange.

Further in accordance with this invention, the portion of flange 105 which extends axially outwardly from plate 103 serves to effectively inhibit water (e.g., rain) from entering the bearing and from adversely affecting the lubrication of the bearing) i.e., washing the lubricating oil from the oil wick lubrication system disposed within hub 12 between the hub and bearing closure 101). With bearing closure 101 pressed into hub 12 on the outboard side of bearing assembly 45 and with shaft 10 coaxially received within the flange, rain water running down to the outer face of plate 103 will encounter flange 105 and will flow around the outer surface of the flange and thence down the outer surface of plate 103 below the flange without entering the inside of bore of flange 105 and without entering the bearing. It has been found desirable that a sharp edge 107 (i.e., a square cutoff or bevel) be provided on the outer end of flange 105. Specifically, this sharp edge, due to surface tension of the water, will effectively prevent water on the outer surface of the flange from running around the outer end of the flange and from entering the bore of the flange.

Still further, as indicated at 108 in FIG. 5, a portion of flange 105 extends axially inwardly from plate 103 toward bearing assembly 45. This inner flange portion 108 is unitary with the remainder of bearing closure 101 and is formed by a groove 109 in plate 103 around the flange with the inner wall and base of the groove extending inwardly from plate 103. Groove 109 has an open mouth which faces outwardly away from bearing assembly 45. In addition to forming the inwardly projecting flange portion 108 this groove also aids in inhibiting water from entering the bore of flange 105 and from contaminating the bearing. Specifically, as water runs down the outer face of plate 103 toward flange 105, the water flows into the open groove and around the flange. Below the flange, the water is discharged out of the groove and continues to flow downwardly on the outer face of plate 103 away from flange 105 and clear of hub 12.

While flange 105 is shown to be integral with plate 103 and with the remainder of bearing closure 101, it will be understood that the flange could be constituted by a tubular member fitted into a central bore in plate 103 and welded to the plate.

As shown in FIG. 5, bearing closure 101 has an outer shoulder 111 which is sized to be press into hub 12 of end shield 11. As indicated at 101' FIG. 6, an alternative construction of bearing closure 101 is illustrated in which the end of the bearing closure received in hub 12 is bent back on itself, as indicated at 113, so that upon being pressed into hub 12, this bent back portion 113 is at least somewhat compressed in radial direction thereby to securely hold the bearing closure in place in the hub.

Numerous variations, within the scope of the appended claims, will be apparent to those skilled in the art in light of the foregoing disclosure and accompanying drawings. Thus, the design silhouette of bearing closures 2 and 101 may vary in other embodiments of this invention. Although various materials were described as preferred, other materials may be substituted for those described. Relative dimensions and sizes of the component parts of the bearing closures 2 and 101 may be varied. These variations are merely illustrative.

Having thus described the invention, what is claimed and desired to be secured by Letters Patent is:

1. A bearing closure assembly for a motor, the latter having a shaft and a bearing for journalling the shaft, said bearing closure assembly having means for effectively preventing airborne lint or dust from entering said bearing and yet for permitting increased radial tolerances between said shaft and said bearing closure assembly, said airborne dust preventing means comprising a generally planar surface of said bearing closure assembly on the outboard side of said bearing and another portion connected to said planar surface defining an opening for reception of said shaft, said other portion having an axial length of dimension A and clearing said shaft at its closest point along the entire axial length of A dimension by a dimension B with the ration A/B being at least as great as 5/1, said planar surface being defined by a first part and a second part, each of said parts having a layer of material attached to one another to delimit said surface, said other portion being formed from the material layers of said first and second parts and extending therefrom in axially opposite directions.

2. The bearing closure assembly of claim 1 wherein said motor includes an end shield having a self-aligning bearing mounted therein, said self-aligning bearing receiving said shaft, and an oil slinger positioned between said self-aligning bearing and said bearing closure assembly.

3. The bearing closure assembly of claim 1 further including an end shield wherein said first part has a peripheral lip integrally formed with it, said lip being sized for reception in a hub structure of said end shield.

4. The bearing closure assembly of claim 3 wherein said second part has an annular peripheral groove formed in it, said groove being sized to receive a hub ring, and a hub ring mounted in said groove, said first and second parts defining a keeper for said hub ring.

5. A bearing closure assembly for a motor, the latter having a shaft and a bearing for journalling the shaft, said bearing closure assembly having means for effectively preventing airborne lint or dust from entering said bearing and yet for permitting increased radial tolerances between said shaft and said bearing closure assembly, said airborne dust preventing means comprising a generally planar surface of said bearing closure assembly on the outboard side of said bearing and another portion connected to said planar surface defining an opening for reception of said shaft, said other portion having an axial length of dimension A and clearing said shaft by a dimension B along the entire axial length of A dimension with the ration A/B being at least as great as 5/1, said planar surface having a groove therein adjacent said other portion and generally concentric therewith, said groove being open toward the outboard side of said bearing closure whereby water running down the outer surface of said planar surface toward said other portion enters said groove and flows therein around said other portion clear of said shaft and is discharged from said groove blow said other portion.

6. A bearing closure as set forth in claim 5 wherein said other portion is a flange extending substantially axially in outboard direction from said planar surface whereby water running down the outside of said planar surface toward said shaft encounters said flange and is prevented from entering said bearing.

7. A bearing closure as set forth in claim 6 wherein the outer end of said flange having a sharp edge thereby to prevent water on the outer surface of said flange from flowing around the end of the flange.

8. A bearing closure assembly for a dynamoelectric machine having an end shield and a rotor shaft, said end shield having an outwardly opening hub surrounding and rotatably supporting said shaft, said hub housing a wick lubrication system for said bearing, said bearing closure assembly having an inboard part adapted to be secured on said hub and a wall extending generally radially with respect to said shaft, said wall having an opening therein coaxial with said shaft, said bearing closure assembly further having an outboard part joined to said inboard part, said outboard part having a wall extending radially with respect to said shaft and having an opening therein substantially coaxial with said shaft and with said opening in said inboard part, the portions of said walls of said inboard and outboard parts defining said openings being spaced apart a distance A with the radial walls of the inboard and outboard parts defining the openings therein being spaced from said shaft at its closest point by a radial dimension B with the ratio of A to B being at least 5 to 1 so as to effectively prevent airborne lint or dust from being conveyed past said closure assembly and coming into contact with said bearing.

9. In an electric motor having a bearing support including a hub, a shaft with a longitudinal axis, bearing means in said hub for journalling said shaft, wherein the improvement comprises: a bearing closure outboard of said bearing and surrounding said shaft, but being clear thereof, and being adapted to be secured on said hub, said bearing closure including a wall, and a flange supported by said wall and surrounding said shaft, said flange extending axially from said wall outwardly from said motor, whereby water running down the ouside of said wall toward said flange engages said flange and flows around said flange so as to prevent this water from entering said bearing, said flange having a portion thereof which extends axially inwardly toward said bearing relative to said wall.

10. In an electric motor as set forth in claim 9 wherein the outer end of said flange has a sharp edge thereby to prevent water on the outer surface of the flange from flowing around the end of said flange.

11. In an electric motor as set forth in claim 9 wherein said flange has an axial dimension A, wherein said flange is coaxial with said shaft, and wherein said flange clears said shaft by a dimension B with the ratio of A/B being at least as great as 5/1, said flange clearing said shaft by said dimension B along the entire axial length of the flange axial dimension A so as to effectively prevent airborne dust or lint from entering the bearing.

* * * * *

UNITED STATES PATENT AND TRADEMARK OFFICE
CERTIFICATE OF CORRECTION

PATENT NO. : 4,362,342
DATED : December 7, 1982
INVENTOR(S) : Bushor et al

It is certified that error appears in the above—identified patent and that said Letters Patent is hereby corrected as shown below:

Column 1, line 67, "desirale" should read "desirable".

Column 2, line 57, "runds" should read "runs".

Column 3, line 55, "expendients" should read "expedients".

Column 4, line 64, "30-+'" should read "30-30'".

Column 5, line 12, "lubricant" should read "lubrication".

Column 8, line 9, "blow" should read "below".

Signed and Sealed this

Twenty-ninth Day of March 1983

[SEAL]

Attest:

Attesting Officer

GERALD J. MOSSINGHOFF

Commissioner of Patents and Trademarks